United States Patent [19]

Sato

[11] Patent Number: 5,568,575
[45] Date of Patent: Oct. 22, 1996

[54] OPTICAL ARRAY MODULE AND THE CONTROL METHOD OF THE SAME

[75] Inventor: Kazuyoshi Sato, Tokyo, Japan

[73] Assignee: NEC Corporation, Tokyo, Japan

[21] Appl. No.: 348,149

[22] Filed: Nov. 28, 1994

[30] Foreign Application Priority Data

Nov. 26, 1993 [JP] Japan .................................. 5-295843

[51] Int. Cl.[6] ....................................................... G02B 6/35
[52] U.S. Cl. .................................. 385/16; 385/20; 385/24
[58] Field of Search ................................ 385/15–20, 22, 385/24

[56] References Cited

U.S. PATENT DOCUMENTS

| 4,787,692 | 11/1988 | Spanke | 385/17 |
| 4,822,124 | 4/1989 | Suzuki | 385/17 |
| 5,002,355 | 3/1991 | Caron | 385/16 X |
| 5,048,910 | 9/1991 | Caron | 385/17 |
| 5,241,610 | 8/1993 | Labiche et al. | 385/16 |

OTHER PUBLICATIONS

H. Nishinoto et al., "Polarization Independant LiNbO₃ 8 X 8 Matrix Switch", IEEE Photonics Technology Letters, vol. 2, No. 9, Sep. 1990, pp. 634–636.

Primary Examiner—John D. Lee
Assistant Examiner—Phan T. H. Palmer
Attorney, Agent, or Firm—Foley & Lardner

[57] ABSTRACT

In a light emitting array module comprising light emitting elements arranged in an array fashion, the light emitting elements can be used selectively by monitoring drive states of the light emitting elements if necessary. A plurality of light emitting elements arranged in parallel are coupled to an optical fiber array via an optical switch which can switch optical paths of emitted light. Besides, the optical switch is provided with a light receiving element coupled to a remaining output port thereof in addition to the optical fibers. Optical paths of lights emitted from the light emitting elements are switched by the optical switch, and an optical signal is converted into an electric signal by the light receiving element to monitor light emitting states of the light emitting element. Drive state of the corresponding light emitting element is controlled by the electric signals. The deterioration of the light emitting element is checked to detect whether the light emitting element is usable or not, and, if it is unusable, the light emitting element is switched by a spare light emitting element.

8 Claims, 4 Drawing Sheets

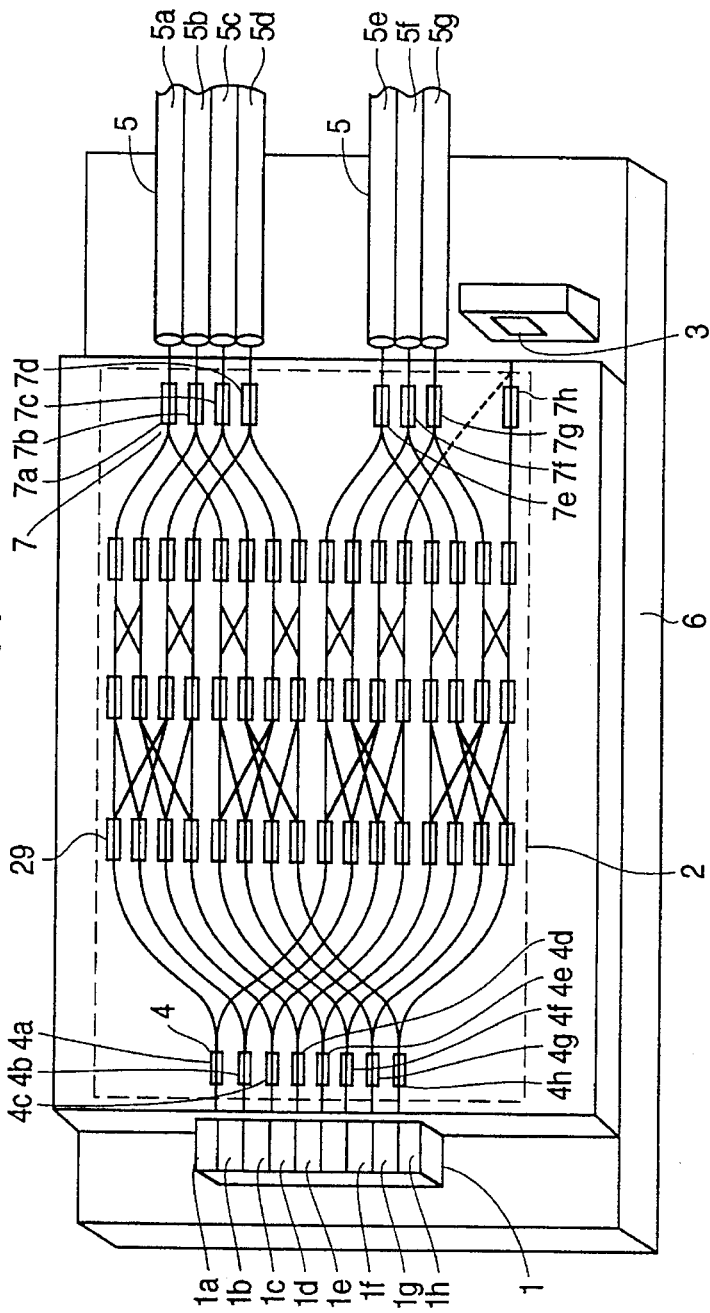
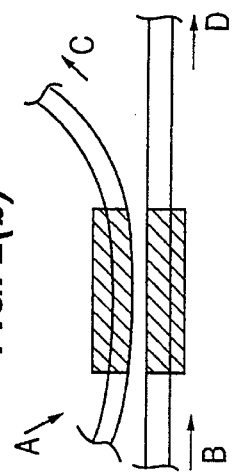
FIG. 2(a)
FIG. 2(b)

OPTICAL ARRAY MODULE AND THE CONTROL METHOD OF THE SAME

BACKGROUND OF THE INVENTION

The present invention relates to a light emitting array module comprising one or more light emitting elements and, more particularly, to a transmission light emitting array module and a control method of the same for use in an apparatus for transmitting bidirectional burst signals.

An optical parallel transmission system is excellent in transmission speed, transmission distance and EMI-proof characteristic (resistibility to the influence of EMI) in comparison with an electric parallel transmission system. Moreover, since the volume of the cable per se used as a transmission line can be extremely reduced, wide applications such as a computer interface are expected. A plurality of light sources are indispensable to the optical parallel transmission system. To reduce the size of the transmitting apparatus so as to cut down the cost, it is extremely preferable to utilize a light emitting array module that is formed by aligning a plurality of light emitting elements and optical fibers integrally in an array fashion.

As described in detail later, in a conventional light emitting array module, semiconductor lasers are aligned to obtain the optimum coupling on a substrate, and optical fibers are also aligned on the substrate at the same distance as that of the semiconductor lasers to be optically coupled to the semiconductor lasers. The optical fibers are coupled correspondingly to the semiconductor lasers, and thus are coupled to external optical transmission lines as they are. Therefore, there is a drawback such that, if the failure occurs in even one semiconductor laser, one of optical parallel signals is completely disabled.

The semiconductor laser scarcely degrades abruptly. Normally, the optical output of the semiconductor laser falls gradually. However, in the conventional light emitting array module, neither a monitoring function which monitors the deterioration of the semiconductor lasers nor a switching function which switches the failed semiconductor laser into a spare semiconductor laser is provided. Therefore, since the extremely deteriorated semiconductor laser cannot be detected in advance, there is a possibility that the communication is suddenly disabled. In addition, there is another drawback such that the communication must be interrupted for a long time since it takes a lot of time to exchange the failed semiconductor laser with a new one.

SUMMARY OF THE INVENTION

An object of the present invention is to provide a light emitting array module which is capable of detecting operating states of a light emitting element, when required, and is also capable of performing a burst signal transmission with a high reliability.

Another object of the present invention is to provide a method of controlling the light emitting array module. This array module is capable of detecting operating states of a light emitting element and selectively switching the light emitting element to be used, as required, so as to perform a stable optical parallel transmission.

A light emitting array module of the present invention comprises at least one light emitting element, an optical switch for switching optical paths for a light emitted from the light emitting element, at least one optical fiber coupled optically to the light passing through the optical switch, and at least one light receiving element for receiving said light passing through the optical switch.

Also, at least one light emitting element is aligned in parallel at regular interval. The optical switch is a waveguide type optical switch includes at least one optical waveguide arranged on the input side. Each optical waveguide is coupled to each light emitting element. An optical switch section for switching optical paths of the optical waveguide on the input side, and a plurality of optical waveguides are aligned on the output side at regular interval. At least one optical fiber is aligned at the same interval as that of said plurality of optical waveguides on the output side.

Furthermore, in the above structure, said plurality of optical waveguides on the output side are larger in number than the at least one optical fiber coupled optically to the optical waveguides. At least one optical waveguide is arranged as a remaining optical waveguide on the output side not coupled to at least one optical fiber. The remaining optical waveguide is coupled to the light receiving element for receiving light emitted from the remaining optical waveguide.

In a method of controlling a light emitting array module of the present invention the array module comprises a light emitting array module including at least one light emitting element, an optical switch for switching optical paths for a light emitted from the light emitting element, at least one optical fiber coupled optically to the light passing through the optical switch, and at least one light receiving element for receiving the light passing through the optical switch. The method comprises the step of switching optical paths of light emitted from the at least one light emitting element to convert optical signal into electric signal by the light receiving element; and controlling operating states of the at least one light emitting element by the electric signal converted by the light receiving element.

In addition to the above controlling method, a method of controlling a light emitting array module of the present invention further comprises the step of switching optical paths of light emitted from the at least one light emitting element to convert an optical signal into an electric signal by the light receiving element. Whether the at least one light emitting element is usable or not by checking light emitting level of at least one light emitting element based on the electric signal is determined. The determination step is sequentially performed for every light emitting element by switching the optical paths by optical switch, so that only the light emitted from the at least one light emitting element which is determined as usable in said determining may be coupled to at least one optical fiber.

In the present invention, a plurality of light emitting elements aligned in an array fashion are coupled to optical fibers of the optical fiber array correspondingly via the optical switch so that the light emitting elements can be selectively used. The light receiving element as well as the optical fiber array are arranged on the output side of the optical switch. By switching the optical paths of the emitted light from the light emitting elements to the light receiving element by the optical switch, the light emitting states of the light emitting element can be monitored and the deterioration of the light emitting element can also be checked. When the light emitting elements are used as the light source for transmitting the optical signals, their optical paths may be switched appropriately to be coupled to desired optical fibers.

Also, the deterioration condition of the light emitting elements can be determined sequentially by receiving emitted lights from the light emitting elements by means of the light receiving element. As a result, it is possible that only usable light emitting elements are selected and coupled to the optical fiber array. If the light emitting elements which are larger in number than the optical fibers of the optical fiber array are arranged, the optical transmitting and receiving apparatus can be provided with the redundance system to increase the reliability.

BRIEF DESCRIPTION OF THE DRAWINGS

The above-mentioned and other objects, features and advantages of the present invention will become more apparent from the following detailed description when taken in conjunction with the accompanying drawings wherein:

FIGS. 2a and 2b are top views showing a structure of an embodiment of a light emitting array module according to the present invention;

DETAILED DESCRIPTION OF THE PREFERRED EMBODIMENT

Figure 1:
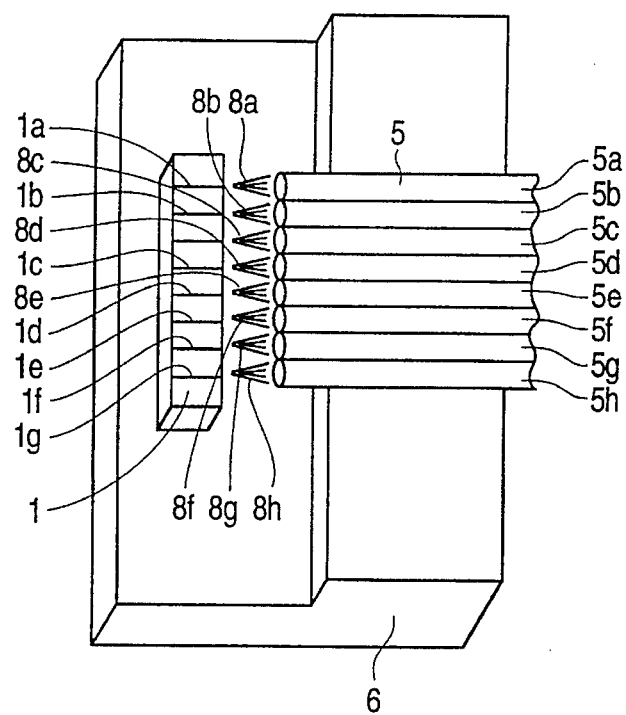
FIG. 1 is a top view showing a structure of the conventional light emitting array module.

To make it easy to understand the prevent invention, first a structure of the conventional light emitting array module wherein a plurality of light emitting elements are formed integrally is shown in FIG. 1. The light emitting array module comprises an light emitting element array 1 having eight light emitting elements $1a$ to $1h$ aligned at regular interval, and an optical fiber array 5 including eight optical fibers $5a$ to $5h$ aligned in an array fashion at the same regular interval as that of the light emitting elements. In the light emitting array module shown in FIG. 1, lights $8a$ to $8h$ emitted from the light emitting elements $1a$ to $1h$ are coupled optically to respective channels of the optical fibers $5a$ to $5h$ correspondingly.

In the light transmitting and receiving apparatus for transmitting burst signals, only when the optical signals must be transmitted from the transmitting apparatus, a bias current and a modulation signal current are applied to the light emitting elements in the apparatus to drive the elements. Only when the signal is being transmitted actually, the receiving apparatus can receive the signal. Thus, when the signal cannot be transmitted due to the deterioration of the light emitting elements, the receiving apparatus cannot receive the signal at all. However, it is not determined whether the transmitting apparatus is not transmitting the signal at that time or the transmitting apparatus cannot transmit the signal because of the deterioration of the light emitting elements although the transmitting apparatus have to transmit the signal essentially. No means for detecting the deterioration of the light emitting elements is provided and thus an alarm cannot be generated. Further, even when the deterioration of the light emitting elements can be detected, the system must be interrupted since the light emitting elements have to be exchanged or repaired. Therefore, in the conventional structure, there is a drawback such that a stable burst signal transmission cannot be achieved since there is no means for detecting effectively the deterioration of the light emitting elements used for the burst signal transmission.

An embodiment of the present invention will then be explained hereinafter with reference to the accompanying drawings.

FIG. 2(a) is a top view showing an embodiment of a light emitting array module according to the present invention. The light emitting array module of this embodiment comprises a light emitting element array 1, an optical switch 2, an optical fiber array 5, and a light receiving element 3. The light emitting element array 1 consists of eight light emitting elements $1a$ to $1h$ aligned at regular interval of 300 μm. The optical waveguides $4a$ to $4h$ on the input side of the optical switch 2 are aligned at the same regular interval as that of the light emitting elements $1a$ to $1h$ of the light emitting element array 1. The optical fiber array 5 is formed by aligning seven optical fibers $5a$ to $5g$ at regular interval.

The optical switch 2 is an optical switch of $LiNbO_3$ waveguide type. The switch 2 is obtained by forming an optical switch pattern made of Ti film on a $LiNbO_3$ substrate 6 and then diffusing the Ti film into the substrate 6 by heating the optical switch pattern up to a high temperature of 1050° C. for about 8 hours. In addition, an electrode made of a Cr—Pt—Au film formed on the surface of the substrate 6 via $SiO_2$ film is provided. The optical switch 2 is provided with 63 optical switch elements 29 (a rectangular portion shown in FIG. 2), each optical switch element 29 is for switching an optical path of a first input or a second input into an optical path of a first output or a second output. By combining optical paths switched by these optical switch elements with each other, eight optical waveguides $4a$ to $4h$ on the input side and seven optical waveguides $7a$ to $7g$ on the output side and the optical path of the light receiving element 3 can be selected freely.

A structure of respective optical switch element and an operational principle thereof will then be explained. FIG. 2(b) shows a structure of a single optical switch element 29. For instance, if the optical switch has 240 optical switch elements, two input ports A and B and two output ports C and D are provided for each optical switch element. Two states can be switched by the optical switch 2, that is, one is a first state wherein the light input to the input port A is output to the output port D and the light input to the input port B is output to the output port C, the other is a second state wherein the light input to the input port A is output to the output port C and the light input to the input port B is output to the output port D. As described above, the optical switch element is formed on the $LiNbO_3$ substrate 6 and, when the voltage is not applied to the electrode formed on the surface, the switch keeps the first state 1 and, when the voltage is applied to the electrode, the switch changes its state into the second state since a refractive index of the optical waveguide is changed by means of the electro-optical effect of the substrate 6 and thus coupling states of input ports and output ports are changed.

Figure 3:
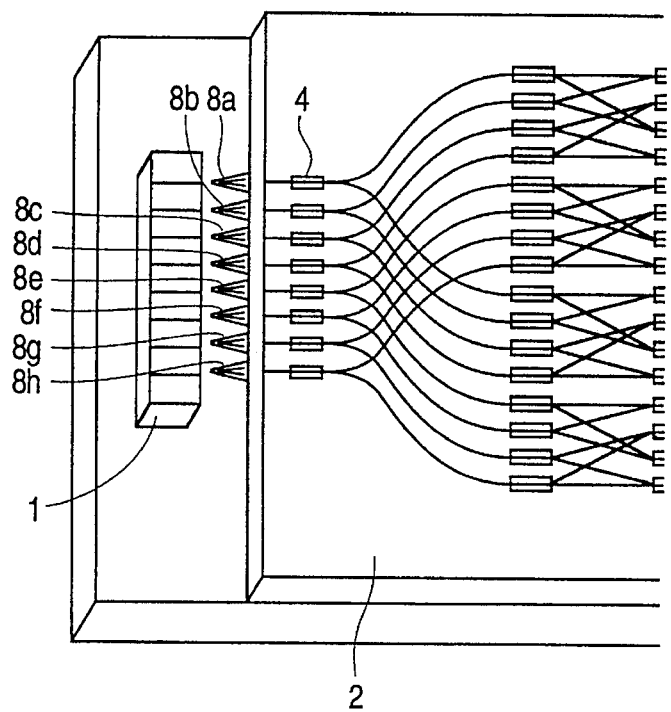
FIG. 3 is a top view showing a coupling portion of input side optical waveguides and a light emitting element array according to the present invention.

FIG. 3 shows a structure of a coupling portion of input side optical waveguides 4 and a light emitting element array 1. Lights $8a$ to $8h$ emitted from the light emitting elements 1a to 1h shown in FIG. 2 are optically coupled to corresponding input ports of the input side optical waveguides 4a to 4h. In this embodiment, a semiconductor laser diode array is used as the light emitting elements 1a to 1h. In the array, the semiconductor laser diodes are formed by using a crystal-growth method on the same substrate and aligned in an array fashion. A light emitted from respective semiconductor laser diode is collected by a micro lens array (not shown) arranged near the end surface thereof, and is optically coupled to corresponding one of the input side optical waveguides 4a to 4h. The micro lens array used herein is formed such that a multi-component glass substrate having circular mask patterns formed at desired interval is ion-exchanged to form a refractive index distribution so that the glass substrate could have a lens effect.

Figure 4:
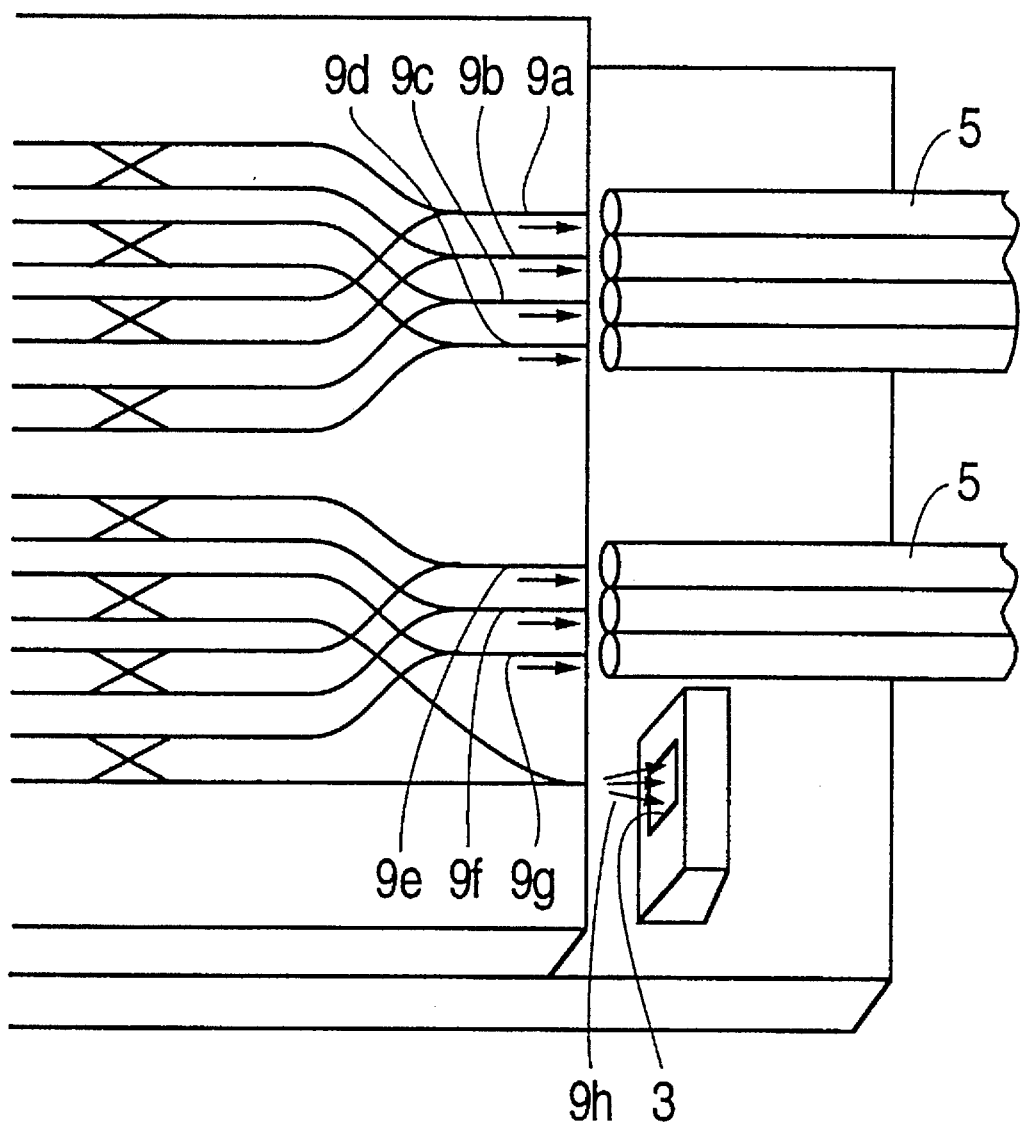
FIG. 4 is a top view showing a coupling portion of optical fibers and light receiving elements and a coupling portion of optical fibers and output side optical waveguides according to the present invention.

In this embodiment, the optical fiber array 5 comprises seven optical fibers 5a to 5g. Lights emitted from eight light emitting elements 1a to 1h are selected by the optical switch 2 and then output to seven optical fibers 5a to 5g after. As shown in FIG. 4, the waveguides 7a to 7g of the output side optical waveguides 7 are coupled respectively to the optical fibers 5a to 5g, and the remaining waveguide 7h is coupled to the light receiving element 3. Thus one light emitting element among the eight light emitting elements 1a to 1h is always coupled to the light receiving element 3. By switching optical paths in the optical switch 2, the light emitted from respective light emitting element can be received sequentially by the light receiving element 3.

With the above, the light emitting array module which couples the lights output from a plurality of light emitting elements into a plurality of optical fibers can be used as a light source of the parallel light transmission. In the light emitting module thus constructed, optical paths of the output lights can be switched by arranging the optical switch 2 between the light emitting elements and the optical fibers so that a desired light emitting element can be used selectively. In particular, a reliability of the light source can be improved by providing larger light emitting elements in number than optical fibers as redundant light emitting elements. Besides, if the receiving elements are coupled to part of output ports of the optical switch 2 to receive output lights from the light emitting elements, light emitting state of the light emitting elements can be monitored and the deterioration of the light emitting elements can be detected.

Next, an operation of the light emitting array module of the above embodiment will be explained in case the module is applied to the transmitting and receiving apparatus for transmitting bidirectional burst signals.

Figure 5:
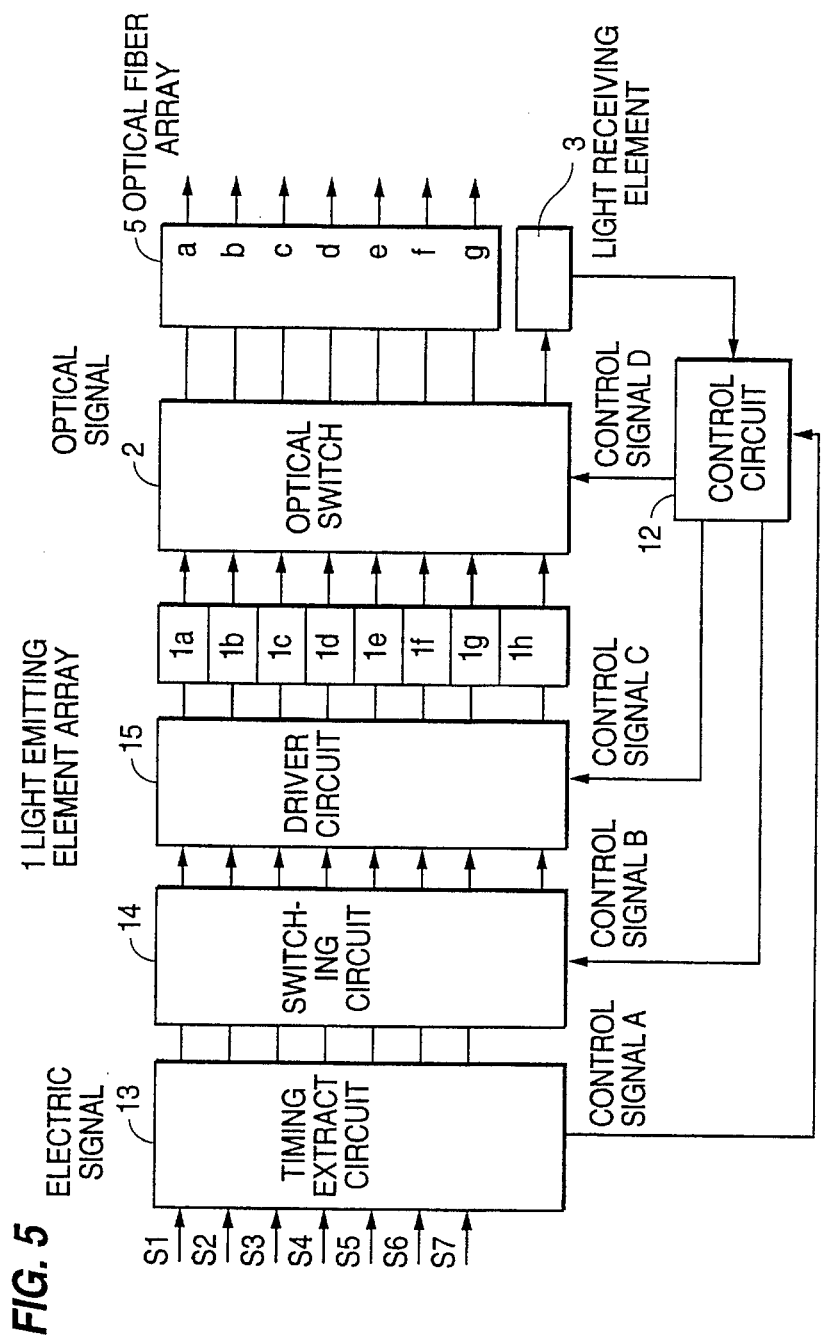
FIG. 5 is a block diagram illustrating a control method for the light emitting array module according to the present invention.

FIG. 5 is a block diagram illustrating a structure of the transmitting and receiving apparatus for a burst signal transmission. In FIG. 5, a module having the same structure as that shown in FIG. 2 is used as the light emitting array module. Parallel electric signals S1 through S7 to be transmitted are input into a timing extract circuit 13 once to monitor transmit/stop states of each electric signal. After confirming transmit/stop states of each electric signal, the electric signal is input, as it is, into a switching circuit 14. The switching circuit 14 selects channels connected to a driver circuit 15 which drives each light emitting element of the light emitting array. That is, it is determined by switching the channel which light emitting element of the light emitting element array should be connected to electric signals S1 through S7. Ordinarily, if no abnormality is detected in all light emitting elements, the signal S1 is connected to the light emitting element 1a, the signal S2 is connected to the light emitting element 1b, and so on. The switching circuit 14 is an electric switching circuit, and any electric switching circuit such as a relay circuit may be used as the switching circuit 14.

After the light emitting elements to be connected to the electric signals S1 through S7 are determined, the bias current and the modulation signal current are supplied to corresponding light emitting elements 1a to 1g from the driver circuit 15. Modulated optical signals are emitted from the light emitting elements to the optical switch 2. In this embodiment, if no abnormality is detected in the light emitting elements, the light emitting element 1h is used as a spare light emitting element.

In the optical switch 2, optical paths for modulated optical signals input from the light emitting elements 1a to 1g are determined. Namely, it is determined, in the optical switch 2, which optical fibers of the optical fibers 5a to 5g in the optical fiber 5 should be connected to the modulated optical signals. In this embodiment, the optical paths are selected such that the electric signals S1 through S7 correspond to the optical fibers 5a to 5g. Therefore, if no failure is found in the light emitting elements, the optical paths are connected corresponding optical fibers, as they are, without being switched.

The light receiving element 3 is connected to a control circuit 12 which causes the optical switch 2 to switch the optical paths of switching elements. The control circuit 12 is connected to the switching circuit 14 for switching channels of the electric signals S1 through S7 and the driver circuit 15 for driving the light emitting elements 1a to 1h, as well as the optical switch 2.

An operation of the transmitting and receiving apparatus using the light emitting array module according to the present invention will then be explained.

Figure 6:
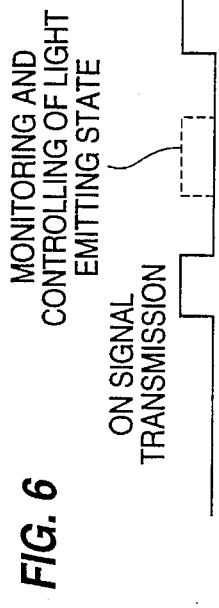
FIG. 6 is a timing chart showing the operations of monitoring and controlling the light emitting state of the light emitting elements according to the present invention used in the burst signal transmission.

FIG. 6 is a timing chart showing the operations of monitoring and controlling the light emitting state of the light emitting elements according to the present invention used in the burst signal transmission. In the burst signal transmission, while at least any one signal is transmitted from the timing extract circuit 13, the light emitting elements 1a to 1g are coupled to corresponding optical fibers 5a to 5g, respectively, unless the deterioration of the light emitting elements is detected. Only the light emitting element 1h is connected to the light receiving element 3. Under this condition, as described above, the optical paths of the optical switching elements in the optical switch 2 are not switched.

Next, when it is determined by the timing extract circuit 13 that no signal is input into the transmitting and receiving apparatus, i.e., the optical signal is in a stop state, the timing extract circuit 13 outputs a control signal A to the control circuit 12. Thus the control circuit 12 outputs a control signal D to the optical switch 2 to switch the optical paths of the optical switch 2 sequentially. At the same time, the control circuit 12 outputs a control signal C to the driver circuit 15 to drive the light emitting element which is being connected to the light receiving element 3. According to above procedures, first the light emitting element 1a is coupled to the light receiving element 3 so that the light emitting state of the light emitting element 1a is monitored to determine whether or not the deterioration occurs in the element 1a. Then the light emitting elements 1b, 1c, 1d . . . are coupled sequentially to the light receiving element 3 in the same manner, and the light emitting state of the light emitting elements 1b, 1c, 1d . . . are determined in the same manner. If no light emitting element is deteriorated after the light emitting state of all light emitting elements are checked, the connection states return to first set states and the communication is then restarted.

However, if it is determined that any light emitting element, for instance, the light emitting element 1c, is deteriorated and then it cannot be used, the channels of the switching circuit 14 are switched by the control signal B output from the control circuit 12 to connect the channel of the signal S3 to the light emitting element 1h. At the same time, optical paths of the optical switch 2 are switched by the control signal D of the control circuit 12 so that the optical path of the light emitting element 1h is connected to the optical fiber 5c. The control signal C is output from the control circuit 12 to the driver circuit 15 to disable the light emitting element 1c and to enable newly the light emitting element 1h. Under the stop state wherein no signal is transmitted, the light emitting elements may be again monitored by changing the optical paths and the channels described above if necessary.

As described above, monitoring of the light emitting elements and switching the connection between the switching circuit 14 and the optical switch 2 in case the deterioration of the light emitting elements may be conducted whenever no signal state is confirmed by the timing extract circuit 13. Ordinarily, since, in the parallel signal transmission, the signal transmission of the channels are performed simultaneously, the timing can be easily extracted. Even when the timing of the signal transmission of the channels are different, it is sufficiently possible to detect time when all the channels are in a stop state simultaneously since a time ratio of actual signal transmission in the burst signal transmission is small. In addition, in case the optical paths are switched by the optical switch 2 to connect a certain light emitting element to the light receiving element, the signal may be being transmitted with respect to the channel to which the optical switch element comprising the optical switch 2 is not operated. Accordingly, by monitoring transmission/stop states of respective signal by means of the timing extract circuit 13, the above light emitting elements may be monitored and checked by confirming stop states of only the channels to be switched and the channels for the optical switch elements which must be operated upon switching the optical paths. Additionally, although, in the present embodiment, the transmission/stop state of the signal is confirmed by receiving the transmitted signals by the timing extract circuit, it is needless to say that this confirmation and transmission to the control circuit may be executed on the transmission apparatus side.

As described above, because of arranging the optical switch between the light emitting elements and the optical fibers and providing spare light emitting elements, light emitting states of all the light emitting elements can be monitored and, when the abnormality occurs in certain light emitting elements, such light emitting elements can be immediately exchanged for the spare elements. Thus the reliability of the light source of the optical parallel transmission system can be extremely improved.

Although, in the present embodiment, the micro lens is used to couple the light emitting elements to the optical waveguides on input side, they can be directly coupled without using the micro lens. Also, in the present embodiment, the light emitting elements are aligned at equal distance, but they are not limited to this arrangement. Furthermore, although, in the present embodiment, eight light emitting elements and seven optical fibers are aligned, these are not limited to this embodiment. These numbers may be set to be equal. On the contrary, the number of the light emitting elements may be set larger than that of the optical fibers to provide the redundant light emitting elements. Also, although one light receiving element for monitoring is provided in this embodiment, two or more light receiving elements may be provided to monitor a plurality of light emitting elements simultaneously.

The $LiNMbO_3$ waveguide type optical switch is exemplified in the present embodiment, but the semiconductor optical switch may also be used as the optical switch. Besides, a mechanical optical switch as well as a quartz waveguide type optical switch may be used. Furthermore, in the entire structure, although the light emitting elements, the optical switch and the light receiving element are formed as a hybrid structure, these elements may be formed integrally together on the same semiconductor substrate.

Also, the operation of the light emitting array module of the present invention is explained in the burst signal transmission system by way of example, but, needless to say, the present invention is not limited to the burst signal transmission system. The present invention is also applicable to the optical source of other optical parallel transmission system.

As described above, in the light emitting array module of the present invention, the light emitting elements aligned in an array fashion are coupled to the optical fiber array via the optical switch, and part of the light emitting elements are coupled to the light receiving element. By switching the optical paths of the emitted lights from the light emitting elements to the light receiving element so as to receive the emitted lights by the light receiving element, the light emitting states of the light emitting element can be monitored and the deterioration of the light emitting element can also be checked. Also, the deterioration condition of the light emitting elements can be determined sequentially and only usable light emitting elements can be selected to couple to the optical fiber array. As a result, the optical parallel transmission with a high reliability can be performed.

What is claimed is:

1. A light emitting array module comprising:
   a plurality of light emitting elements for converting electrical signals transmitted by a plurality of channels into optical signals;
   an optical switch for switching optical paths for light emitted from said light emitting elements;
   a plurality of optical fibers coupled optically to said light passing through said optical switch;
   at least one light receiving element for receiving said light passing through said optical switch and for checking whether said light emitting elements are functioning properly;
   a timing extract circuit for extracting timing of said electrical signals and for determining a stop state of each electrical signal;
   a switching control circuit for controlling said optical switch to connect said light emitting elements under said stop state to said light receiving element; and
   a switching circuit for selecting light emitting elements which are functioning properly for connection to said channels.

2. A light emitting array module according to claim 1, wherein said plurality of light emitting elements are aligned in parallel at a regular interval,
   said optical switch is a waveguide type optical switch which includes at least one optical waveguide arranged on an input side, each optical waveguide being coupled to each light emitting element, an input optical switch for switching optical paths of said optical waveguide on the input side, and a plurality of optical waveguides aligned on an output side at a regular interval, and said plurality of optical fibers are aligned at the same interval as that of said plurality of optical waveguides on the output side.

3. A light emitting array module according to claim 2, wherein said plurality of optical waveguides on the output side are larger in number than said plurality of optical fibers coupled optically to said optical waveguides, at least one optical waveguide on the output side is arranged as a remaining optical waveguide on the output side and is not coupled to said plurality of optical fibers, and said remaining optical waveguide is coupled to said light receiving element.

4. A light emitting array module according to claim 2, wherein said plurality of light emitting elements aligned in parallel at a regular interval is made of a semiconductor laser diode formed on a substrate.

5. A light emitting array module according to claim 1, wherein said optical switch is made of a LiNbO$_3$ waveguide type optical switch.

6. A light emitting array module according to claim 1, wherein said optical switch is made of a semiconductor optical switch.

7. A method of controlling a light emitting array module, comprising the steps of:

converting electrical signals to optical signals via a plurality of light emitting elements;

switching optical paths of light emitted from said plurality of light emitting elements;

determining, via a timing extract circuit, a stop state of each electrical signal;

controlling said switching step to connect said light emitting elements under said stop state to a light receiving element;

checking, via the light receiving element, whether said plurality of light emitting elements are functioning properly; and switching to connect the light emitting elements which are functioning properly to said electrical signals.

8. A method of controlling a light emitting array module according to claim 7, further comprising the steps of:

performing sequentially said checking step for every light emitting element; and switching said optical paths so that only said light emitted from said light emitting elements which are determined to be functioning properly in said checking step may be coupled to at least one optical fiber.

* * * * *